Aug. 21, 1951     M. D. WELSH     2,565,415
BABY CARRIAGE AND BASSINET
Filed Feb. 7, 1947     3 Sheets-Sheet 1
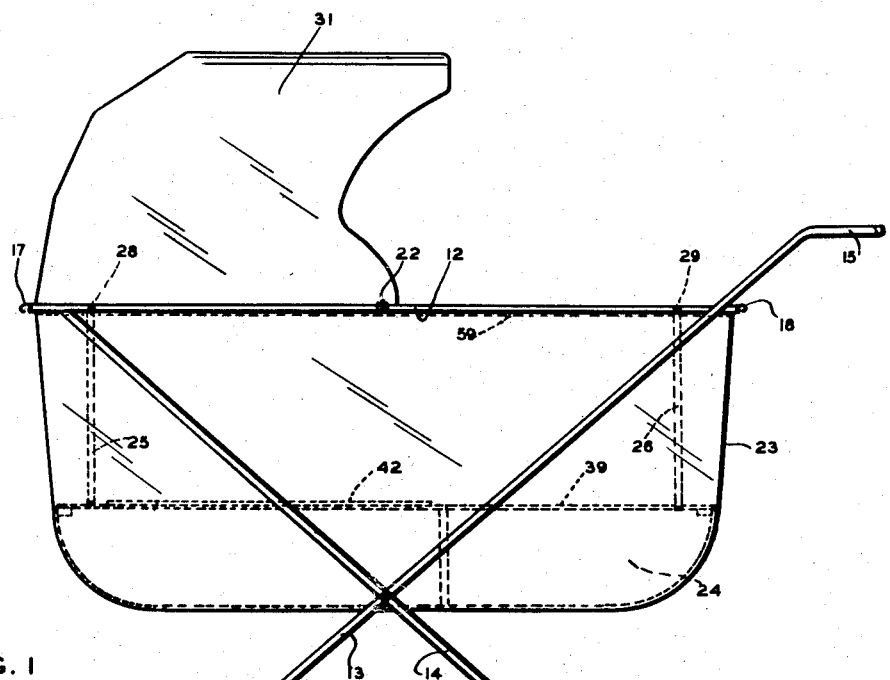
FIG. 1
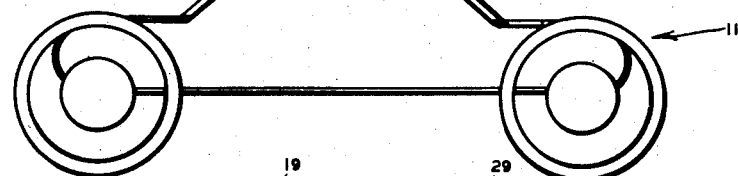
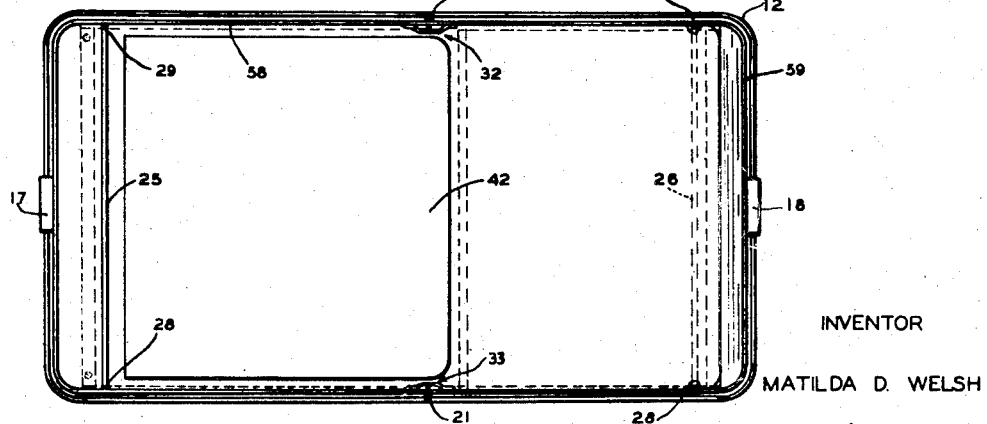
FIG. 2
INVENTOR
MATILDA D. WELSH
BY *John H. Cassidy*
ATTORNEY Aug. 21, 1951 M. D. WELSH 2,565,415
BABY CARRIAGE AND BASSINET
Filed Feb. 7, 1947 3 Sheets-Sheet 2
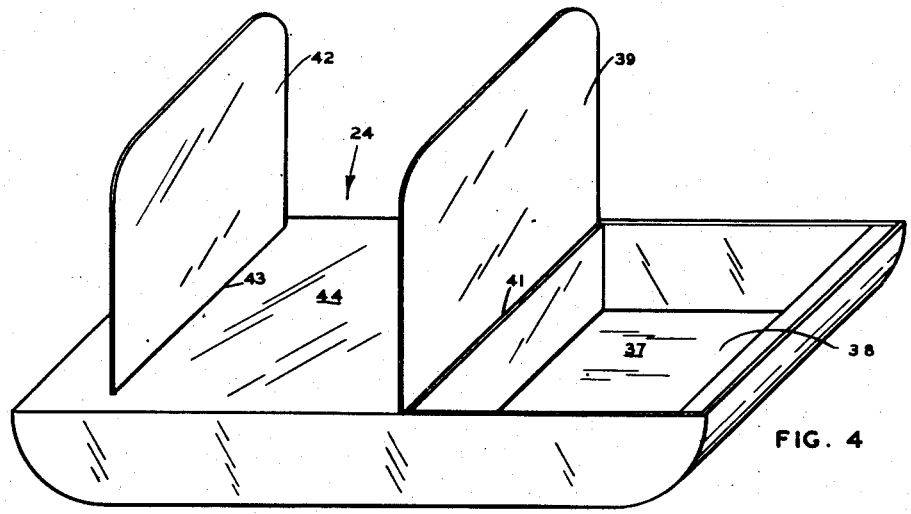
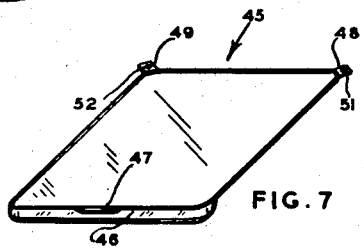
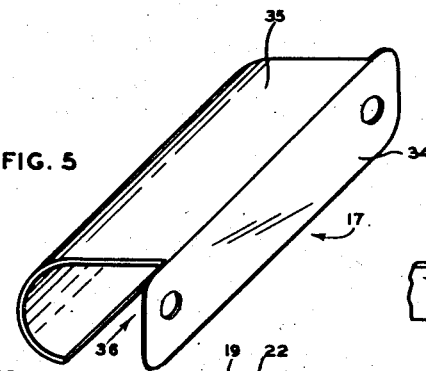
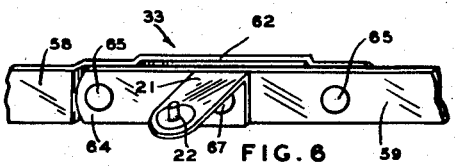
INVENTOR
MATILDA D. WELSH
BY *John H. Cassidy*
ATTORNEY Aug. 21, 1951  M. D. WELSH  2,565,415
BABY CARRIAGE AND BASSINET
Filed Feb. 7, 1947  3 Sheets-Sheet 3

INVENTOR
MATILDA D. WELSH
BY *John H. Cassidy*
ATTORNEY

Patented Aug. 21, 1951

2,565,415

UNITED STATES PATENT OFFICE 2,565,415

BABY CARRIAGE AND BASSINET

Matilda D. Welsh, St. Louis County, Mo.

Application February 7, 1947, Serial No. 727,012

3 Claims. (Cl. 296—27)

This invention relates to baby carriages and has for its principal object the provision of a carriage, the body of which is removable from its carriage frame for use as a bassinet, car carrier, or the like.

More specifically, it is an object of the invention to provide a baby carriage body taking the form of a fabric sack suspended on a frame supported on an open framework of the carriage which is given form and rigidity by a removable section retainable in the bottom portion of the sack by pivoted members depending from the sack frame.

A further object of the invention is to provide a baby carriage having a suitable framework in which a carriage body may be suspended, a removable canopy for the carriage body and a removable apron for covering a portion of the body not protected by the canopy.

It is also an object of the invention to provide a baby carriage having a removable body, which may be supported in or removed from the carriage frame, and which carries a removable supporting section mounting a back support and a hinged flap, the latter of which may be folded into a position forming a chair seat to expose a depressed compartment in said section forming a footrest therein.

Yet another object of the invention is the provision of a baby carriage having a removable section forming a component part of its body, which may be easily removed for quick and thorough cleaning.

A still further object of the invention is the provision of a baby carriage having a removable body adaptable to support a child in either a reclining or sitting position when used in connection with the carriage proper, as a car carrier, or as a bassinet.

Figure 8:
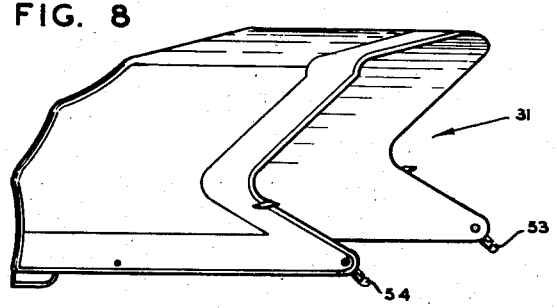
Figure 9:
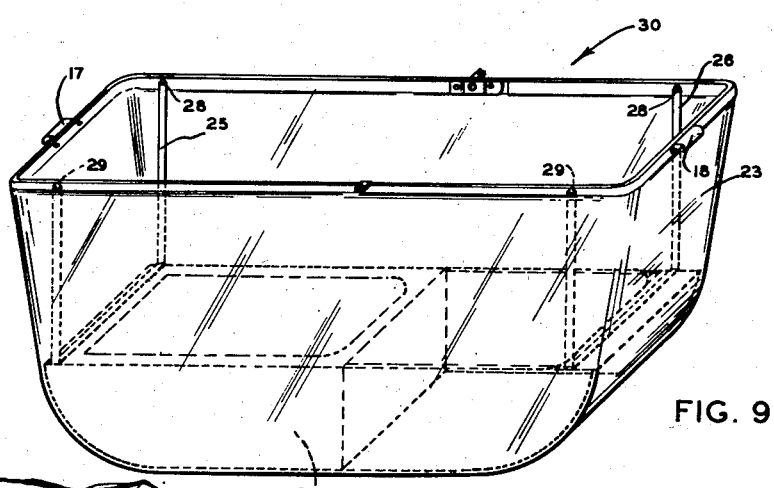
Figure 10:
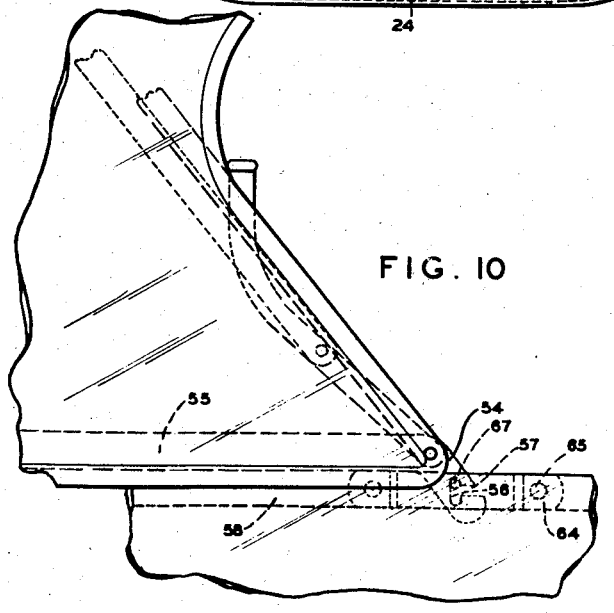

Other objects and advantages will become apparent as the description proceeds and a more comprehensive understanding of the invention will be afforded from the following detailed specification when considered in conjunction with the accompanying drawings in which Fig. 1 is a side view of a baby carriage embodying the instant invention, Fig. 2 is a plan view of the baby carriage body illustrating the same as supported in the carriage frame, and showing the parts arranged to support a child in a reclining position, Fig. 3 is a plan view of the carriage body showing the same supported in the frame thereof with the parts arranged to support a child in a sitting position, Fig. 4 is an isometric view of a rigid section contained within the bottom of the carriage body, Fig. 5 is a detail view of the handles by means of which the removable body may be transported and by means of which the same is suspended in the carriage frame work, Fig. 6 is a detail view of one of the body's side supporting brackets and canopy supports, Fig. 7 is a plan view of an apron or flap by which a portion of the open body is covered, Fig. 8 is an oblique view of the carriage's removable canopy, Fig. 9 is an oblique view of the carriage's body showing the same removed from the carriage frame for use as a bassinet, car carrier or the like, and Fig. 10 is a detail view of a connecting bracket for the carriage's removable canopy illustrating its mode of attachment with the carriage frame.

As contemplated in a preferred embodiment of the invention and as illustrated in Fig. 1, a baby carriage is provided comprising a wheeled chassis 11 which supports through four upright members an open rectangularly shaped frame 12. Only two of the upright members 13 and 14 are shown in the figure, there being an identical pair of uprights on the other side of the carriage. The members 13 (one on each side) extend upwardly and are joined with a handle 15 of the carriage. Supported on and carried within the frame 12 is a removable carriage body which comprises in part a metallic frame 16 of similar shape. This latter frame has attached thereto two handles 17 and 18 (of identical construction and illustrated in detail in Fig. 5) by means of which it may be carried, together with two side brackets 19 and 21, each of which mounts a fastener 22 (Fig. 6). These handles together with the brackets 19 and 21, support the frame 16 on the frame 12.

Hanging from the frame 16 is a fabric sack 23 which also is a part of the carriage body. Within this sack is a bottom section 24 which is rigid in character, the same being formed preferably of wood or light metal. This section is maintained in place in the fabric sack by means of two U-shaped bows 25 and 26 attached to the frame 16 and pivoted about their connecting points 28 and 29. The arms of these bows are so dimensioned as to cause the end and side walls of the sack to be stretched taut to give it form and shape. In this manner the frame 16, the sack 23 and the bottom section 24 are assembled to form a rigid carriage body 30 (Fig. 9) which is removable as a unit from the frame 12. The removable body 30 is provided, also, with a removable canopy 31 connected to supports 32 and 33 on the body frame 16, more particularly described hereafter.

The handles 17 and 18, Fig. 5, have a face 34 attachable to the frame 16, and a handle section 35 which is rounded for comfortable holding. This latter section extends away from the face 34 to provide an opening 36 along the entire length of the handle into which the frame 12 may pass.

The section 24 of the body 30 (Figs. 4 and 9) is rigid in nature and is constructed to have a depressed compartment 37, the bottom 38 of which provides a footrest, when the carriage is arranged to support a child in a sitting position and which is closed by a flap 39, hinged along a line 41. A similar flap 42, hinged along a line 43, provides a back rest for the child in its sitting position when the same is moved backwardly to rest against the wall of the fabric sack. When the carriage is conditioned to support a child in a reclining position, both of the flaps 39 and 42 are folded downwardly and presents a smooth, flat surface as is illustrated in Fig. 2. In this case the flap 39 spans the opening to the compartment 37 and the flap 42 lies flat on a top 44 of the section.

A fabric apron 45, illustrated in Fig. 7, is provided to cover the forepart of the carriage body as a protection against the weather. This apron has a flap 46 which fits along and over the front end of the frame 16 when the body is removed from the carriage frame or over the front end of the frame 12 when the body is in place. It has a hole 47 cut centrally therein at the juncture of the flap to fit over the handle 18. Two extended ears 48 and 49 carry fasteners 51 and 52 which engage with the fasteners 22 on the side brackets 19 and 21 to hold the apron in place.

It will be noted from the foregoing description a baby carriage is provided which has a body that is removable for use as a bassinet, a car carrier, or a car seat. (See Fig. 9.) Also, and for any of its uses, it may be conditioned to support a child either in a reclining position or a sitting position. Furthermore, the body may be completely or partially covered depending upon whether the removable canopy 31 and apron 45 are used together or separately. Thus, the body may be covered by both the flap and the canopy, by the canopy alone, or by the flap alone.

It will be apparent, also, that the removable section 24 of the body may be taken from the fabric sack 23 and quickly and easily cleaned. All that is required here is to fold the U-shaped brackets 25 and 26 upwardly and out of engagement with the section thereby permitting the latter to be removed from the sack. When used with a folding chassis and canopy, the section can be removed from the sack, the latter can be collapsed, and the whole carriage can be folded into a "knock down" position requiring a minimum of storage space.

The features of the invention relating to the removable body 30, and the removable canopy 31 will be described further with reference to Figs. 8, 9 and 10 of the drawings. Here, and as is illustrated in Fig. 9, it will be seen that the body 30 can be removed from its supporting frame 12 for any of the many uses previously described. When used as a bassinet, a car carrier, or the like, it is more often than not unnecessary to have the canopy 31 attached to the carriage body, and accordingly the same is so constructed as to be instantly removable from the body frame.

For removably attaching the canopy 31 to the body 30, the former is provided with two attaching brackets 53 and 54 (Fig. 8) which may be fixed onto, or formed as a part of, the lower bow 55 (Fig. 10) of the canopy frame. Each bracket has a pin resting slot 56 cut therein substantially at a right angle with a pin entering slot 57 with which it communicates. In attaching the canopy 31 to the body 30, the brackets 53 and 54 are passed respectively into their supports 32 and 33 which are formed as parts of the body frame 16.

With reference to Figs. 3 and 6, it will be seen that the frame 16 is formed from two bow-like members 58 and 59. The ends of the member 58 have off-set portions 61 and 62 which parallel the straight ends 63 and 64 of the member 59, and these are joined as by the rivets 65 to form the supports. A pin or rivet 67 is passed through the supports 32 and 33 at each side of such supports. These pins are engaged respectively by the canopy brackets 53 and 54 by first moving the latter members downwardly into the supports then forwardly until each of the pins pass through the pin entering slots 57 and come to rest in the tops of the pin resting slots 56, as shown in Fig. 10.

When positioned thusly the canopy may be pivoted freely about the pins 67 and the same will remain in place until the canopy is raised upwardly and moved rearwardly to withdraw the pins from the canopy brackets.

This mode of attachment for the canopy is adaptable to any suitable type canopy frame, but by way of a more detailed explanation the frame of the removable canopy 31 may take the form of that described in a co-pending application for Canopy Frame, by Matilda D. Welsh, Serial No. 656,259, filed March 22, 1946, now Patent No. 2,461,014 granted Feb. 8, 1949.

While a preferred embodiment of the invention has been illustrated and described it is possible that the same could be practiced in other ways without departing from its basic concepts. Accordingly, and insofar as all changes and modifications to which the invention is susceptible fall within the appended claims, they are covered as if described.

What is claimed is:

1. The combination with a portable baby carrier having a frame and a body portion extending therefrom and taking the form of a sack held taut by a plurality of bows attached to and depending from the frame, a removable rigid bottom assembly in said sack and comprising a flat box positioned beneath and engaged by said bows, said box assembly including a rigid bottom, sides, a top for said box having a fixed and a hinged section, said latter section taking the form of a pivoted individual first flap covering an operable footrest compartment in said box with the first flap mounted to be folded back over said fixed section to provide the open compartment, and an individual second flap hinged to said fixed top section and mounted for individual movement between a position above the same and a raised position against a wall of said sack to form a back rest.

2. In a baby carriage having a wheeled chassis, the improvement comprising a continuous top rigid open frame having integrally a pair of side members and a pair of end members supported by the chassis, a removable carriage body having a second continuous ring like frame proportioned to fit within said first mentioned open frame member of the chassis, outwardly extending devices on said second continuous frame member to engage and hang upon the other continuous frame, a non-rigid sack depending from said second continuous frame member, a rigid removable body section constructed and adapted to fit within and form a bottom for the sack, and brace members extending between said second continuous frame member and said body section, pivotally connected to one and removably engaging the other, whereby the walls of said sack are made taut between said second continuous frame member and said body section.

3. In combination with a baby carriage having a wheeled chassis supporting an open continuous frame, a removable carriage body comprising a ring-like frame insertable in said open frame and supported thereon by extensions attached to said ring-like frame, a sack depending from said ring-like frame, a removable rigid body section having a flat top and supported in said sack, and means for retaining said body section in place comprising a pair of U-members having their upper ends pivotally attached to said ring-like frame and their bottoms engaging the top of said rigid body section.

MATILDA D. WELSH.

REFERENCES CITED

The following references are of record in the file of this patent:

UNITED STATES PATENTS

| Number | Name | Date |
|---|---|---|
| 337,926 | Coggins | Mar. 16, 1886 |
| 1,881,579 | Hoch et al. | Oct. 11, 1932 |
| 1,978,915 | Siebert et al. | Oct. 30, 1934 |
| 2,055,890 | Berry | Sept. 29, 1936 |
| 2,134,855 | Bucher | Nov. 1, 1938 |
| 2,257,943 | Feldman | Oct. 7, 1941 |
| 2,277,406 | Mahr | Mar. 24, 1942 |
| 2,399,359 | Kroll et al. | Apr. 30, 1946 |
| 2,431,259 | Kroll et al. | Nov. 18, 1947 |

FOREIGN PATENTS

| Number | Country | Date |
|---|---|---|
| 21,096 | Great Britain | Nov. 3, 1894 |
| 33,806 | France | Aug. 21, 1928 |
| | (1st addition to No. 631,218) | |
| 592,715 | France | May 6, 1925 |